Nov. 13, 1934.   C. S. JOHNSON   1,980,622
WHEAT FLOUR MILLING PROCESS
Filed Feb. 15, 1930   2 Sheets-Sheet 2

Inventor
Cyrus S. Johnson
By Clarence A. O'Brien
Attorney

Patented Nov. 13, 1934

1,980,622

UNITED STATES PATENT OFFICE 1,980,622

WHEAT FLOUR MILLING PROCESS

Cyrus S. Johnson, Thompson Township, Fulton County, Pa.

Application February 15, 1930, Serial No. 428,701

4 Claims. (Cl. 83—42)

This invention relates to an improved and novel system, process, and means for milling and conditioning wheat flour and analogous material for the trade.

My primary aim is to provide a structure of this classification which will make it possible to produce a commercial flour of an unusually fine and smooth consistency, susceptible of more practical and efficient use in the baking and analogous trades.

In accordance with the inventive conception, I accomplish the desired results by utilizing appropriate physical means for subjecting the soft fine middlings to a treatment by introducing previously and partially ground and assorted fine soft middlings in a fine state into a slowly rotating container, and also simultaneously introducing into this container coarse ground middlings, whereby through a method of stock against stock attrition, the fine soft material is pulverized to an unusually fine and smoother condition to reduce it into a more successful commercial product.

A feature of novelty is predicated upon a new mechanical arrangement of details which introduces or incorporates a slowly rotating agitating and mixing cylinder or container in a conventional type of flour milling system at an appropriate point to permit the coarse granular material of suitable grade and size to be temporarily drawn from the main system to perform its pulverizing work, and to be subsequently carried back into the main system to be reduced into fine soft material.

The invention also has for an object to provide in a system of flour milling the agitation of the soft fine middlings obtained by breaking down the endosperm of the grain or berries with the coarse or more compact middlings also obtained by the breaking down of the endosperm, said middlings being substantially free of bran impurities, and such agitation resulting in a reduction of the soft fine middlings to flour.

The specific arrangement for accomplishing these results will become more readily apparent from the following description and drawings.

Figure 1:
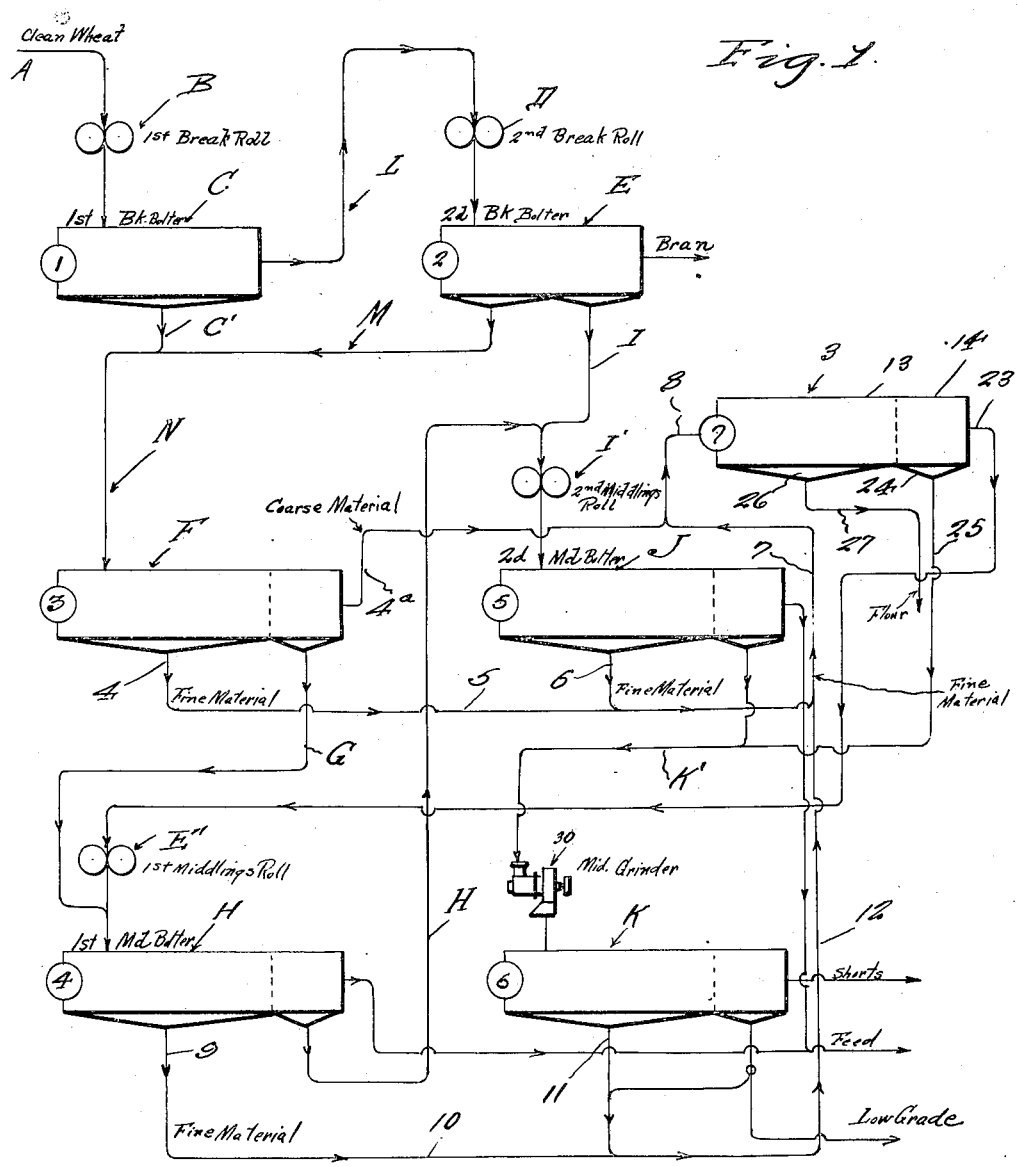
Figure 1 is a diagrammatic view of a system developed in accordance with the present invention.

Before proceeding with a detailed description, I wish to call attention to the fact that the diagram utilized as the primary portion of the system in the drawings in Figure 1 is a milling diagram of the August Wolf & Co. type. In fact, it is of the species known in the trade as Drawing 74 (short type).

In order that the existing parts of the system may be distinguished from the revised features, I have utilized letters to designate the details and have included certain seemingly essential legends, giving the names of parts. Also, I have employed separate ordinals or numerals to distinguish the new parts so that it may be easily determined what portion is the supplemental part of the system, although I claim novelty in the combination of the improved features with the old features.

Attention is first invited to Figure 1, wherein the completed revised arrangement of details is properly charted. The clean wheat enters the system at the point A, a suitable duct or pipe (not shown) being employed. In fact, the arrows are used to represent the general direction of the sections of piping defining the so-called duct or conveying conduit for the various grades of materials.

The clean wheat is first subjected to the action of the first break crushing rolls B to crack the bran and break down the endosperm. This breaking down of the endosperm produces some soft fine middlings or particles together with coarse or more compact middlings or particles. The crushed wheat is delivered into the first break bolter C. This is a conventional type of separating bolter. A portion of this material is discharged at the point C'. The remainder passes through the duct L and is then subjected to the second break crushing rollers D after which it passes into the second break bolter E. The line M carries a portion of the material into the complemental line N where it is delivered into the third bolter F.

The coarser material flows down through the duct I between the crushing rollers I' and into No. 5 bolter J in which the second middlings stock is bolted. The coarser material from the bolter F is carried through the duct G where it is by-passed around the crushing rollers E' and delivered into the bolter H. The coarser material from the bolter H is carried through the duct H' between the crushing rollers I' and delivered into the bolter J.

The sixth bolter is distinguished by K, and communication is afforded therewith by way of the duct K'. This is of course, a conventional method of handling wheat for milling flour in the type of mill before specified. No claim is made to any of the features before described, except in combination with the supplemental details to be hereinafter specified. The additional legends appearing on the drawings will enable the reader to further ascertain the operation of the old system.

I now invite attention to the numeral 3 in Figure 1 which designates generally the improved or supplemental part of this system. This is variously referred to as the agitating and pulverizing cylinder, or rotary receiver for accommodating the fine and coarse materials to be brought into stock against stock relationship for pulverizing purposes.

Soft fine middlings are delivered from the outlet 4 of the bolter F and carried through the line 5. Likewise soft fine middling of substantially the same consistency is discharged from the outlet 6 of the bolter J into the line 5 and these products are carried through the portion 7 of a delivery pipe or duct leading to the intake 8 of the device 3. The coarse or more compact middlings are carried from the point 4a of the bolter F through a line or duct which also joins the intake pipe 8. The different middlings as delivered to the device 3 are substantially free of bran impurities.

Figure 4:
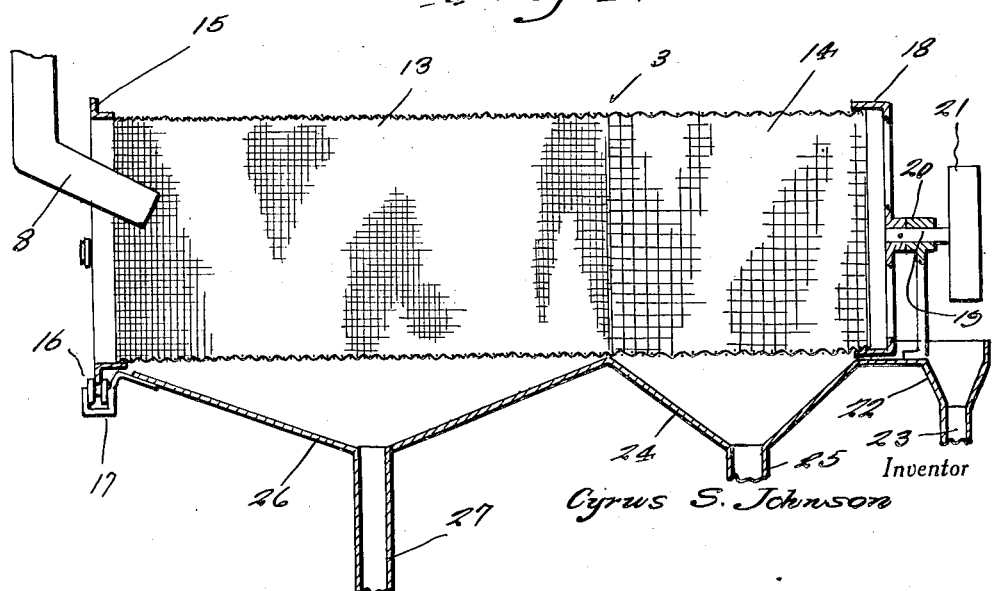
Figure 4 is a longitudinal section through the improved features mixing and pulverizing cylinder, of the revised system.

Attention at this time is invited to Figure 4 wherein it will be observed that the device 3 comprises an open-ended cylinder clothed with appropriate screening. For instance, that portion distinguished by the numeral 13 is a fine mesh material and the portion 14 of a coarser mesh. At the left hand end is an annular track 15 cooperating with a guide roller 16 supported in an appropriate bracket 17. At the right hand end, which is also open, is a supporting ring 18 carrying a shaft 19 journalled for rotation in the bearing 20.

On this shaft is a pulley 21. Underneath the pulley is a funnel receiver 22 with which the coarser granular middlings return pipe 23 is connected. The reference numeral 24 represents a similar funnel receiver under the coarse screen 14 with which the pipe line 25 is connected. Then too, the larger funnel receiver 26 connects with the finished product flour delivery pipe 27.

Figure 2:
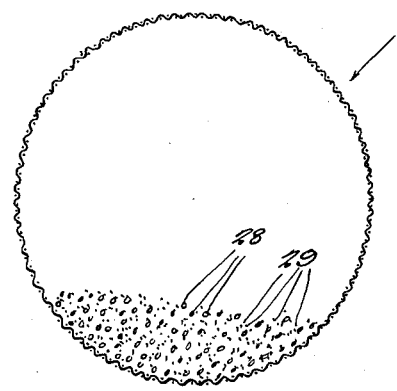
Figure 2 is a transverse sectional view through the cylindrical mixing and pulverizing cylinder or container.
Figure 3:
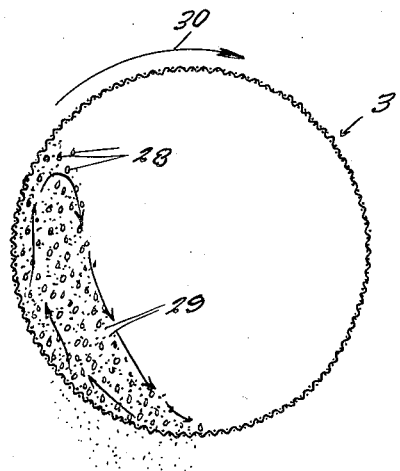
Figure 3 is a view like Figure 2, showing the manner in which the mass of material is carried upwardly and agitated slowly to accomplish the desired stock against stock pulverizing action.

As is understood, this cylinder 3 is rotated slowly so that the mass of material is acted upon as represented in Figures 2 and 3. In Figures 2 and 3 the reference numerals 28 designate the coarser particles of the material and 29 the soft fine middlings to be pulverized. The cylinder rotates in the direction of the arrow 30. It rotates sufficiently slow to carry the mass of material up one side to a point where it is rolled and dumped back into the bottom of the cylinder after the fashion of a tumbling action, as shown in mass formation in Figure 2.

This allows the coarser granular particles of middlings to react upon the finer particles to pulverize the latter. In operation, the soft fine middlings are delivered into the intake pipe 8 from several distant sources in the main part of the system. For instance, in the point 4 of the bolter F, from the point 6 of the bolter J, from the point 9 of the bolter H, and from the point 11 of the bolter K. The pipe line 5 affords a communication between the points 4 and 6 and 7 with the intake 8.

The pipe lines 10 and 12 afford the desired communication between the points 9 and 11 with the intake 8. The pulverizing action is obtained by the slow rolling and overturning and mixing of the coarse granular middlings 28 with the soft finer middlings 29 in the screened cylinder 3. The finished product is discharged from the funnel 26 into the line 27 into an appropriate receiver (not shown).

A portion of fine material not pulverized fine enough to pass through screen 13 passes through screen 14 and is carried through the funnel 24 and the return line 25 and back into the line K' and into the middlings grinder 30 and into the bolter K. The coarse granular middlings used for pulverizing, pass over screen 14 and discharge through the end funnel 22 and are carried through the line 23 back to the first middling crushing rollers E', their old original course, and into the first middling bolter H.

The gist of the invention, it will be understood is in extracting coarse granular material as needed from the main system while in transit therethrough and by-passing it into the device 3 where it is utilized for pulverizing the soft finer materials also simultaneously delivered into this device 3. Then carrying the properly graded coarse granular materials back into the main system to be properly conditioned and delivered in a soft fine state into the same device 3.

This simplifies the method of milling flour and provides an expedient process which is economical and practical. It is thought however, that persons skilled in the art to which the invention relates will be able to obtain a clear understanding of the merits and the operations and features after considering in connection with the drawings, the aforegoing specification. Therefore, a more lengthy description is thought to be unnecessary.

Minor changes in the mechanical factors and agents forming a part of the system may be resorted to. In fact many revisions coming within the scope of the discovery as defined in the claims may be resorted to without departing from the spirit of the invention or the inventive thought comprehended in the claims.

I claim:

1. In a milling system including the bolters, crushing rolls and conduits for connecting the said elements together, an auxiliary bolter, conduits connecting the same with the soft material outlets of the other bolters, a conduit connecting the auxiliary bolter to one of the coarse material outlets of one of the other bolters whereby said coarse material will be mixed with the soft material to cause a pulverizing action thereon, and conduits for leading the coarse materials from the tail end of the auxiliary bolter to some of the crushing rolls.

2. In a milling system including the bolters, crushing rollers, and conduits for connecting the said elements together; an auxiliary bolter, conduits connecting the same with the soft material outlet from the other bolters, a conduit connecting the auxiliary bolter to one of the coarse material outlets of one of the other bolters whereby said coarse material free of bran impurities will be mixed with the soft material to cause a pulverizing action thereon, and conduits for leading the coarse material from the pulverizing device back to the milling system.

3. In a system of flour milling the additional step of agitating the soft middlings and the coarse middlings of the endosperm of the grain and substantially free of bran impurities to reduce the soft middlings to flour, separating the resultant flour during the period of agitation, and then returning the remaining coarse middlings to its regular course through the milling system.

4. The system of milling flour which consists in subjecting the whole grain to an action to crack the bran and break down the endosperm, some of which endosperm forming soft fine middlings and other of which endosperm forming coarse middlings, separating the soft fine middlings and the coarse middlings and substantially freeing the same of bran impurities, returning coarse middlings to the soft fine middlings, and then agitating the mixture of such middlings to reduce the soft fine middlings to flour.

CYRUS S. JOHNSON.